US011157945B2

(12) United States Patent
Arntson et al.

(10) Patent No.: US 11,157,945 B2
(45) Date of Patent: Oct. 26, 2021

(54) MARKETING MANAGEMENT SYSTEM (71) Applicant: THE IMAGINE GROUP, LLC, Shakopee, MN (US)

(72) Inventors: Sheri Lee Arntson, Minnetonka, MN (US); Sue Stearns, Lakeville, MN (US); Chris Gustafson, Shakopee, MN (US); Darryl Drozdik, Saint Louis Park, MN (US); Eric Silvernale, Saint Paul, MN (US)

(73) Assignee: The Imagine Group, LLC, Shakopee, MN (US)

( * ) Notice: Subject to any disclaimer, the term of this patent is extended or adjusted under 35 U.S.C. 154(b) by 90 days.

(21) Appl. No.: 16/344,484

(22) PCT Filed: Oct. 23, 2017

(86) PCT No.: PCT/US2017/057922
§ 371 (c)(1),
(2) Date: Apr. 24, 2019

(87) PCT Pub. No.: WO2018/081015
PCT Pub. Date: May 3, 2018

(65) Prior Publication Data
US 2020/0058048 A1  Feb. 20, 2020

Related U.S. Application Data

(60) Provisional application No. 62/412,087, filed on Oct. 24, 2016.

(51) Int. Cl.
*G06Q 30/02* (2012.01)
(52) U.S. Cl.
CPC ..... *G06Q 30/0242* (2013.01); *G06Q 30/0247* (2013.01)

(58) Field of Classification Search
USPC ................................................. 705/27.1, 14.1
See application file for complete search history.

(56) References Cited

U.S. PATENT DOCUMENTS 7,039,599 B2   5/2006   Merriman et al.
8,965,927 B2   2/2015   Ferrara et al.
(Continued)

FOREIGN PATENT DOCUMENTS

EP          2704085 A1    3/2014
JP       2013-117603 A    6/2013
(Continued)

OTHER PUBLICATIONS

Extended European Search Report for corresponding EP Application No. 17865317.6 dated Feb. 6, 2020; 8 pages.
(Continued)

*Primary Examiner* — Afaf Osman Bilal Ahmed
(74) *Attorney, Agent, or Firm* — Winthrop & Weinstine, P.A.; Alicia Griffin Mills; Nadeem W. Schwen (57) ABSTRACT

A non-limiting exemplary embodiment of a system includes metadata for a plurality of locations, metadata for a plurality of fixtures, metadata for a plurality of campaigns, rules for each location, an apparatus for producing signages for the plurality of locations, and filters for segregating the signages produced into a plurality of kits. Another non-limiting exemplary embodiment of a system includes metadata for a plurality of locations, metadata for a plurality of fixtures, metadata for a plurality of campaigns, rules for each location, filters for segregating the display graphics into a plurality of data packets, transmitting the data packet to the location for which it was prepared, and displaying the graphics contained in the data packet in the location to which it was transmitted.

23 Claims, 2 Drawing Sheets

(56) References Cited

U.S. PATENT DOCUMENTS

| | | |
|---|---|---|
| 9,041,707 B2 | 5/2015 | Ferrara et al. |
| 9,275,390 B1 * | 3/2016 | Barnes .................. G06Q 30/02 |
| 9,582,581 B2 | 2/2017 | Ferrara et al. |
| 2005/0203790 A1 | 9/2005 | Cohen |
| 2005/0289001 A1 | 12/2005 | Parnau |
| 2011/0282744 A1 | 11/2011 | Yang |
| 2011/0295764 A1 | 12/2011 | Cook et al. |
| 2012/0296777 A1 * | 11/2012 | Fugman ............. G06Q 30/0281 705/27.1 |
| 2013/0006790 A1 | 1/2013 | Raskin et al. |
| 2015/0088621 A1 | 3/2015 | Shinohara et al. |
| 2015/0248580 A1 | 9/2015 | Ferrara et al. |

FOREIGN PATENT DOCUMENTS

| | | | |
|---|---|---|---|
| JP | 2016-143297 A | 8/2016 | |
| JP | 2016143297 A * | 8/2016 | ............. G06Q 30/02 |
| KR | 10-2016-0036747 A | 4/2016 | |
| WO | WO 2013/187870 A1 | 12/2013 | |

OTHER PUBLICATIONS

International Search Report for corresponding International Application No. PCT/US2017/057922 dated Jan. 30, 2018; 3 pages.
Written Opinion for corresponding International Application No. PCT/US2017/057922 dated Jan. 30, 2018; 6 pages.

* cited by examiner

MARKETING MANAGEMENT SYSTEM

CROSS-REFERENCE TO RELATED APPLICATIONS

This application is a National Phase Application of PCT/US2017/057922, filed on Oct. 23, 2017, which claims the benefit of U.S. Provisional Patent Application Number 62/412,087 filed Oct. 24, 2016, the entirety of which are hereby incorporated by reference.

STATEMENT REGARDING FEDERALLY SPONSORED RESEARCH OR DEVELOPMENT

Not applicable.

TECHNICAL FIELD

The instant disclosure pertains to producing and distributing signages for a plurality of locations.

BACKGROUND

U.S. Patent Application Publication No. 2005/0203790 discloses using simple rule-based instructions for automatically generating customized plans for product allocation and placement in a retail outlet. Descriptions of the business rules and information regarding specific stores is input to the automated system to generate customized planograms for any particular store. Implementations of an Artificial Intelligence engine provide an automated conversion of business rules to mathematical representations to select the optimal product for placement at any given shelf location.

U.S. Patent Application Publication No. 2005/0289001 provides an advertising management system. The system integrates a service provider network with a client network via a network, such as, the Internet to enter, store, use, revise and synchronize advertising material, such as meta-data and images, using advertisement management software.

U.S. Pat. No. 7,039,599 discloses a computer system for automatic replacement of direct advertisements in scarce media including an advertising server for selecting a direct advertisement based on certain criteria. Transaction results of the direct advertisement placement are reported back to the advertising server, and an associated accounting system. In one embodiment, the direct advertiser's server reports transactions back to the advertising server by email. In a second embodiment, a direct proxy server brokers the user's session (or interaction) with the direct advertiser's server, including transaction processing and the direct proxy server reports the results of transactions back to the advertising server and its associated accounting system. A direct proxy provides an independent audit of transactions at a remote direct advertiser's web site. The feedback of the results of direct advertisement transactions provides an efficient utilization of direct advertising space by way of an automated computer system with a predictive model for selection and distribution of direct advertising.

U.S. Patent Application Publication No. 2011/0295764 discloses a method of generating a product layout including obtaining attributes of a retail location; correlating the attributes of the retail location to information relating to a product in order to determine whether the product is appropriate for the retail location; and if the product is appropriate for the retail location, generating a layout of the product within the retail location relative to like products according to one or more predefined rules.

U.S. Patent Application Publication No. 2012/0296777 discloses a dynamic signage device (e.g., a tablet computer) associated with a product, e.g., based on a location of the device and/or the product, and present information about the product to a customer in an interactive manner. The device automatically checks for updated product information and modify its display based on the updated product information. Management of multiple dynamic signage devices can be coordinated within and across stores, and an interactive floor-map creation system incorporating dynamic signage devices can facilitate changing the associations between products and dynamic signage devices.

U.S. Patent Application Publication No. 2013/0006790 discloses an interactive map for a retail store floor to determine product placement. The interactive floor map can be customized for each retail store using custom-designed or pre-defined fixture blocks. Each fixture block includes a display surface, a representation of a product being displayed, and representation of its associated signage. Multiple products can be included in a fixture block and multiple fixture blocks can then be used to complete the interactive floor map for a retail store. Notes can be added at each level of creating the interactive floor map to add details that may be product, fixture, fixture block, and/or location specific. Also, an effective date and time for an interactive floor map for a store can be managed based on the date and time associated with a local time zone where the store is located.

U.S. Pat. Nos. 8,965,927 and 9,582,581 disclose one or more servers performing functions that include: maintaining a database including information relating to facilities that are subject to a first entity, the facilities being dispersed geographically, the information including geographic locations for at least some of the facilities; receiving a first message from a facility for which information is in the database, the first message identifying a fixture of the facility that requires attention, where information in the database for the facility identifies the fixture by at least one of a designation of the fixture and a characteristic of the fixture; sending a second message to a second entity that has contracted with the first entity to provide service within a geographic location of the facility; and enabling the second entity to access the database to identify the fixture.

U.S. Pat. No. 9,041,707 and U.S. Patent Application Publication No. 2015/0248580 disclose a method for confirming compliance with a configuration including: receiving information about a fixture, where the information includes a specified configuration of items to be displayed on the fixture; generating a display using the information, where the display depicts the specified configuration; presenting the display using a graphics system of a computing device; receiving an image depicting an actual configuration of the fixture; associating metadata with the image, where the metadata includes searchable data that distinguishes the fixture from at least some other fixtures of like type; sending the image, along with the metadata, over a network to a server that is remote from the computing device; and in a case that the specified configuration substantially matches the actual configuration, sending, along with the image and the metadata, a message indicating that the fixture is in compliance with the specified configuration.

However, there does not exist a system which can produce the correct amount and type of signages for fixtures installed in different locations. Generally, when a product campaign is initiated, the same number and type of signages are produced and delivered to every location with no consideration being given to whether or not some or most of the signages may not be useable. For instance, a particular location may not have one or more fixtures for which the signages were delivered. As such, all of the extra signages are discarded because they cannot be returned or transferred to another location. Therefore, such prior art systems increase the cost of doing business because they are wasteful.

SUMMARY

A non-limiting exemplary embodiment of the instant disclosure pertains to a system having metadata for a plurality of locations, metadata for a plurality of fixtures, metadata for a plurality of campaigns, rules for each location, an apparatus for producing signages for the plurality of locations, and filters for segregating the signages produced into a plurality of kits. The metadata for each location includes the number of fixtures in the location and the type of each fixture in the location. The metadata for each fixture includes the number of signage holders and the dimensions of a signage for each signage holder. The metadata for each campaign includes a plurality of products associated with the campaign and graphics for each of the plurality of products. The rules for each location define the assignment of one or more products selected from the plurality of products associated with a campaign selected from the plurality of campaigns, the number of signages, the dimensions of each signage, and the graphics for each signage corresponding to one of the one or more assigned products. The apparatus produces signages for the plurality of locations as defined by the rules for each location. Each kit includes signages for one of the plurality of locations as defined by the rules for that location.

Another non-limiting exemplary embodiment of the instant disclosure pertains to a system having metadata for a plurality of locations, metadata for a plurality of fixtures, metadata for a plurality of campaigns, rules for each location, filters for segregating the display graphics into a plurality of data packets, transmitting the data packet to the location for which it was prepared, and displaying the graphics contained in the data packet in the location to which it was transmitted. The metadata for each location includes the number of fixtures in the location and the type of each fixture in the location. The metadata for each fixture includes the number of signage displays. The metadata for each campaign includes a plurality of products associated with the campaign and graphics for each of the plurality of products. The rules for each location define the assignment of one or more products selected from the plurality of products associated with a campaign selected from the plurality of campaigns and the graphics for each signage display corresponding to one of the one or more assigned products. Each data packet includes the display graphics for one of the plurality of locations as defined by the rules for that location.

DETAILED DESCRIPTION

One or more non-limiting embodiments are described herein with reference to the accompanying drawings, wherein like numerals designate like elements. It should be clearly understood that there is no intent, implied or otherwise, to limit the disclosure in any way, shape, or form to the embodiments illustrated and described herein. While multiple exemplary embodiments are provided, variations thereof will become apparent or obvious to a person of ordinary skills. Accordingly, any and all variants for providing functionalities similar to those described herein are considered as being within the metes and bounds of the instant disclosure.

Figure 1:
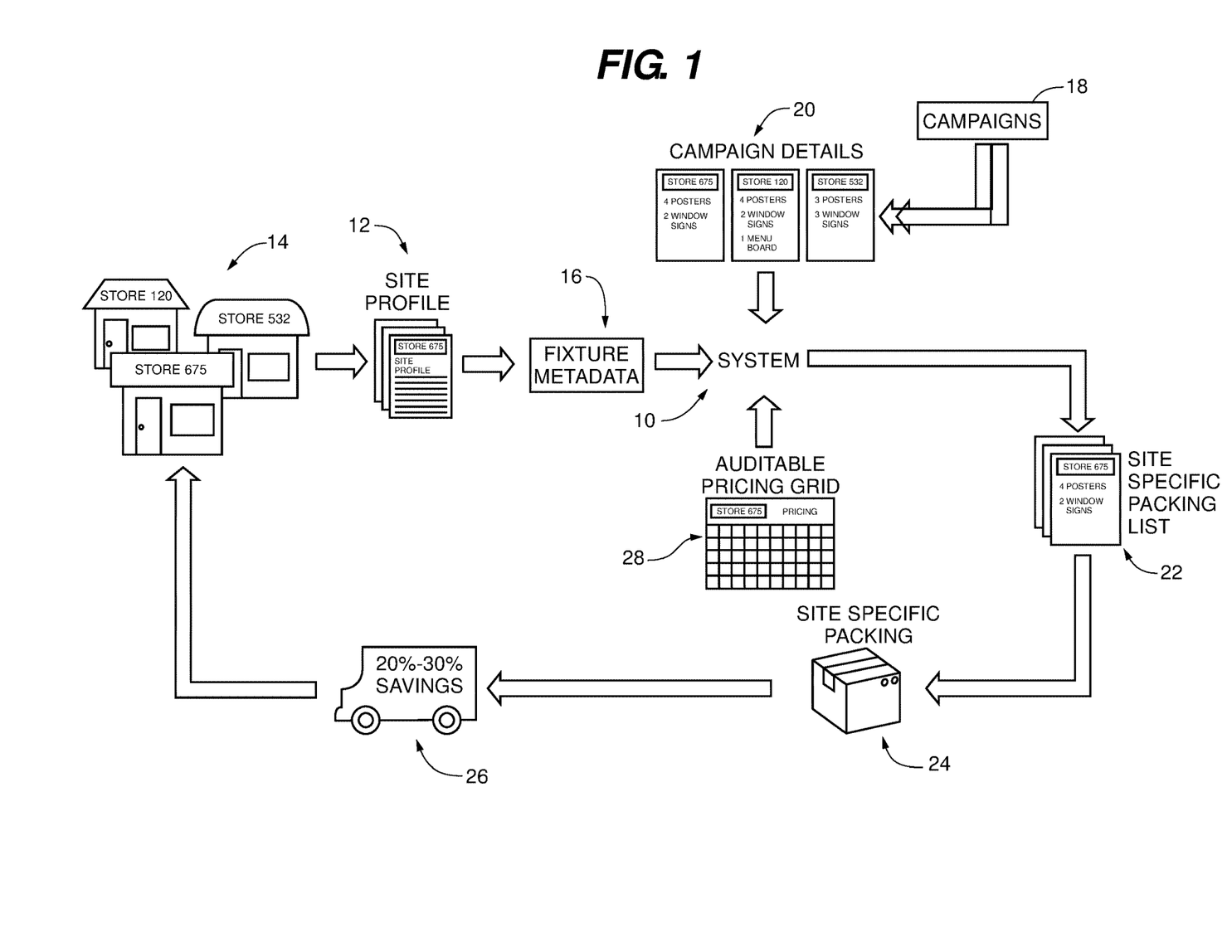
FIG. 1 is a flow diagram of a non-limiting exemplary embodiment of a system in accordance with the instant disclosure.
Figure 2:
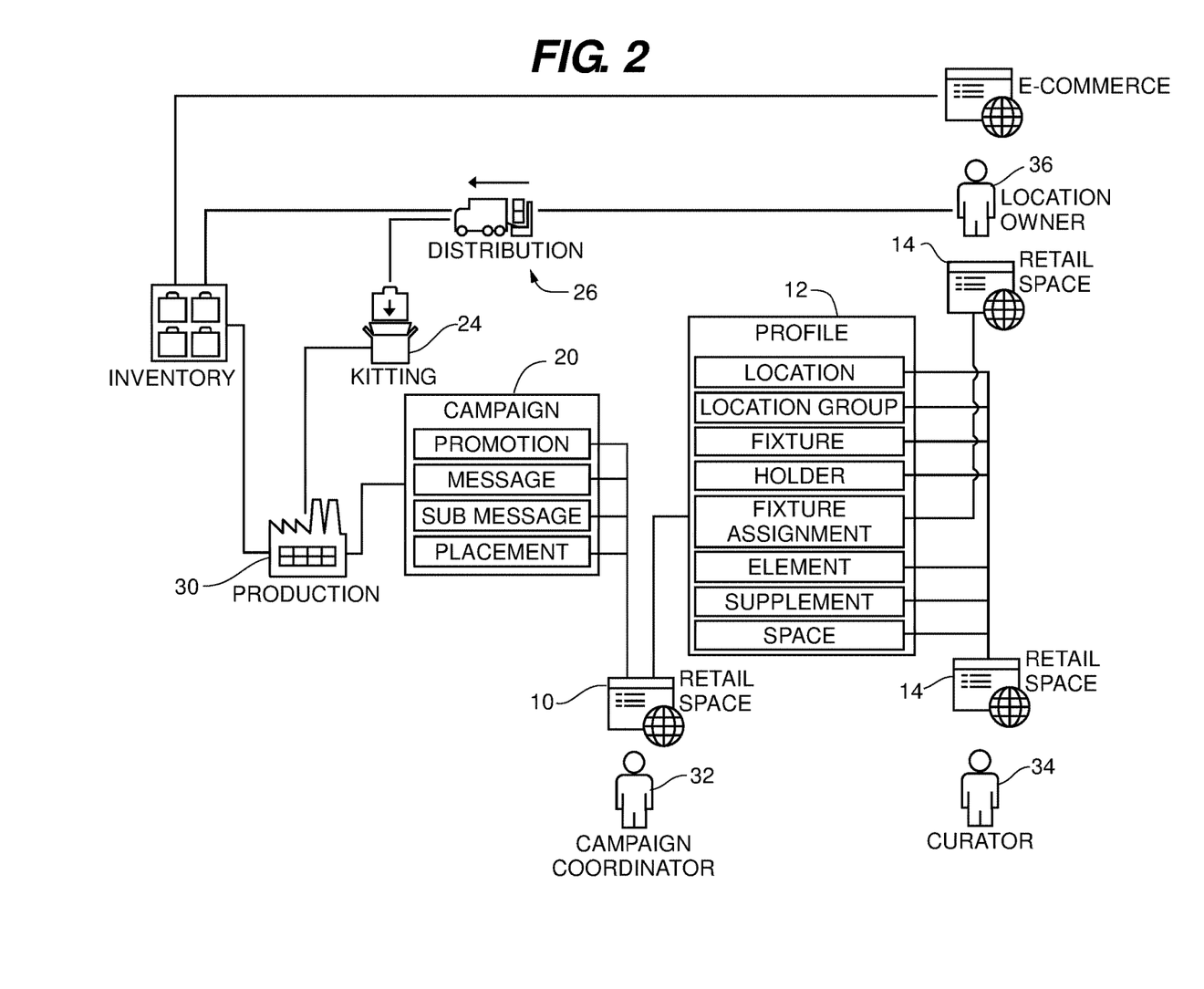
FIG. 2 is another flow diagram of the system of FIG. 1.

FIGS. 1 and 2 are flow diagrams illustrating the interactions between the various components of a system 10 in accordance with a non-limiting exemplary embodiment of the instant disclosure. In general, the system 10 is configured for producing and distributing the correct amount and type of signages to each of a plurality of locations 14.

In some embodiments, the system 10 includes metadata, e.g., profiles, 12 for a plurality of locations 14. The metadata 12 may include information such as, but not limited to, the number and type of fixtures installed in each location. In certain embodiments, the system 10 also includes metadata, e.g., profiles, 16 for all the different types of fixtures that could be installed in one or more of the plurality of locations 14. The fixture metadata 16 may include data such as, but not limited to, the number of signage holders available for each type of fixture, and the dimensions of a signage that can be placed in each signage holder. In some embodiments, the system 10 includes metadata for a plurality of campaigns 18, wherein the metadata for each campaign 20 includes data such as, but not limited to, all available products associated with each campaign 20, and product specific graphics. For each location, the system 10 may further include campaign specific rules 22 such as, but not limited to, an assignment of which products will be displayed, sold or promoted, the number of signages that should be produced and delivered, the dimensions of each signage produced, and the graphics for each signage. The number and dimensions of the signages to be produced is defined by the number and type of fixtures installed in the location. In certain embodiments, the system 10 includes an apparatus 30 for producing the signages for all the locations 14 in conformance or compliance with the rules defining the number, dimensions, and graphics for each location. The number, dimensions, and graphics for the signages produced by the apparatus 30 is an aggregate of the signages required or useable by each of the plurality of locations 14. As such, the system 10 produces only the required signages and nothing extra that would have to be discarded. This results in cost savings. The system 10 further includes filters for segregating the signages produced by the apparatus into a customized kit 24 for each location. As such, each location will receive 26 only the signages that can be used in the installed fixtures. The kit will not contain signages that cannot be used, such as for example, signages for fixtures not installed in the location.

In certain embodiments of the system 10, the metadata for each location includes site specific customized micromarketing data such as, but not limited to, the geographic location, information on one or more competitors within a pre-defined distance, demographics within a pre-defined area, and sales data from a previous campaign substantially similar to the selected campaign. The information on one or more competitors may include a competitors' prices for the same or substantially similar products. It will be readily apparent that such pricing data can provide guidance on setting the price 28 for the products sold in the location. The sales data from the previous campaign can provide insight into the preferences of the customers served at that location. Such data can be useful in determining which of the several products associated with a selected campaign should be sold or marketed at that location. For instance, if the selected campaign includes four products A, B, C, and D, then, based on information such as customer preferences and/or past sales data, only the signages for the products that meet or exceed pre-defined criteria are produced and included in the kit delivered to that location. By way of a non-limiting example, the location will be provided signages for only products A and C because the fixture(s) in that location will be configured to sell only products A and C, and not B and D. It will be readily apparent that if products B and D are not sold at that location, then producing and delivering signages for those products will be a waste of money and resources.

In some embodiments, the geographical location of each of the plurality of locations 14 may be used for assigning location specific products. In certain embodiments, the geographical location data may be used for grouping two or more locations. In some embodiments, the demographics within a pre-defined area of the location can be used for determining which of the several products associated with a selected campaign should be sold or marketed at that location.

In some embodiments, the rules for assigning products to a location may be defined by or based on at least one of the geographic location, information on one or more competitors within a pre-defined distance, demographics within a pre-defined area, and sales data from a previous campaign substantially similar to the selected campaign. For instance, the information on a competitor may include data such as, but not limited to, the products being sold by the competitor that have not been considered for the location. Such information may be useful for introducing new products and/or for determining which products should be sold at a new location under consideration. Essentially, the rules for each location define which products should be assigned for that specific location. For instance, and not limited to, the metadata for two different locations may be similar, but the sales or demand for one or more products may be different for the two locations. Thus, in one exemplary instance, the rules for each location assist in further customizing the kit for that location. In another exemplary instance, the rules for each location may define the pricing strategy for the products assigned to that location.

In certain embodiments, a campaign manager 32 is authorized to add and/or remove a campaign, change the metadata associated with one or more campaign, change the rules for one or more locations, etc. In some embodiments, the campaign manager may be a corporate entity under which one or more locations are operated by one or more franchisees.

In certain embodiments, a curator 34 is authorized to add and/or remove data associated with one or more locations, change certain data associated with one or more locations, etc. In some embodiments, an operator 36 of a location is authorized to add and/or remove data associated with one or more fixtures installed in that location.

In certain embodiments, the metadata for each location may include information such as, but not limited to, the number, type, and dimensions for one or more additional signages that should be produced and included in the customized kit for that location. In some embodiments, the rules for each location may define the graphics for the one or more additional signages. For example, the additional signage may be only for product B and not products A and C assigned to that location. In certain embodiments, the additional signages may be for one or more of displaying on windows, in-store display, external display, etc.

In a non-limiting exemplary embodiment, the system 10 may create or generate or prepare a manifest of the one or more products to be shipped to each location. In some embodiments, the system 10 includes inventory information for the one or more products available at the location, and the manifest may be adjusted, e.g., to change the quantity, type, etc., of the one or more products that should be delivered or shipped to a location. In certain embodiments of the system 10, the location specific manifest may be transmitted to the producer of the products as an order form.

In a non-limiting exemplary embodiment, the system 10 simplifies the process of replenishing one or more signages that may have been damaged. In some embodiments, the ordering or re-ordering process is simplified and less prone to error because the system 10 includes all the pertinent data for every location. And, the amount of information that the curator 34 and/or the operator 36 may need to provide for placing the order is minimized. In some instance, for example, the only required information might the identity of the location (e.g., "Location X") and the identity of the fixture (e.g., "Fixture B"). Since all the pertinent data required for producing the replacement signages, including but not limited to the campaign-specific products assigned to "Fixture B" at "Location X" are known to the system 10, the replacement signages may be produced quickly and with minimal (or no) error and waste. Likewise, in certain embodiments, the curator 34 and/or the operator 36 may simply want to display additional signages such as for instance, but not limited to, increasing sales volume. Again, the system 10 can accommodate such requests quickly with minimal (or no) error and waste. In some embodiments, the system 10 may produce extra signages held in a storage location, e.g., a warehouse. As such, any requests from the curator 34 and/or the operator 36 may be easily and quickly filled without having to set-up the apparatus 30 for a low volume production. In some embodiments, such actions are not limited to the curator 34 and/or the operator 36, but are additionally or in the alternative available to the campaign manager.

While not illustrated, a non-limiting exemplary embodiment of a system "X", similar to the system 10, is contemplated by and considered as being within the metes and bounds of the instant disclosure. One difference contemplated between the two systems, i.e., between the system 10 and the system "X", is the use of fixtures with graphical displays. The system "X" eliminates the need for "producing", "kitting", and physically delivering or distributing the location-specific customized kits containing the signages. In some embodiments, the system "X" includes metadata for a plurality of locations similar to those described with reference to the system 10. In certain embodiments, the system "X" includes metadata for a plurality of fixtures, wherein the metadata for each fixture may include information such as, but not limited to, the number of displays associated with the fixture. In some embodiments, the system "X" includes metadata for a plurality of campaigns similar to the campaign metadata used by the system 10 such as, but not limited to, the products associated with each campaign and the graphics associated with product. In certain embodiments, the system "X" includes rules for a plurality of locations wherein the rules for each location assign one or more products selected from the plurality of products associated with a campaign selected from the plurality of campaigns, and the graphics for the display on the fixtures. In some embodiments, the system "X" includes filters for segregating the display graphics into a plurality of data packets, wherein each data packet includes the display graphics for one of the plurality of locations as defined by the rules for that location. In other words, the filters customize the data packets for each location. In certain embodiments, the system "X" transmits each customized data packet to the location for which it was prepared. In some embodiments, the display graphics included in the transmitted data packets are displayed on the fixtures installed in the location. The transmission of the data packets may be by any of the known means for electrical or digital communications and/or means that may become available. For instance, the means for transmitting the data packets may be, but not limited to, WiFi, cellular, satellite, radio frequency, fiber optic, co-ax cable, etc. In general, any means of transmission within the electromagnetic spectrum is considered as being within the metes and bounds of the instant disclosure.

In some embodiments of the system "X", the metadata for each location includes site specific data such as, but not limited to, the geographic location, information on one or more competitors within a pre-defined distance, demographics within a pre-defined area, and sales data from a previous campaign substantially similar to the selected campaign. In certain embodiments, the metadata in the system "X" for each location is used in a manner similar to that in the system 10. In some embodiments of the system "X", the rules for assigning products to a location may be similar to rules such as those included in the system 10. In certain embodiments of the system "X", one or more of a campaign manager, a curator, and an operator of a location are authorized to add, remove and/or change the metadata, rules, filters, etc., in a manner similar to that described with reference to system 10.

A system, in accordance with a non-limiting exemplary embodiment, is configured for generating information for producing signages for products to be sold or displayed at a plurality of locations. Generally, the system includes establishing metadata of a plurality of locations, correlating the metadata of each location to information relating to one or more products in order to determine whether the product is appropriate for that location and, if the product is appropriate for that location, generating signages for the fixture installed in the location according to one or more predefined rules. In some embodiments, this may also include generating exemplary layouts of the signages.

The metadata of the location may include any information that identifies the characteristics of a location at which the products are sold or displayed. The metadata may include the geographic location, the number of fixtures for the product, and the demographics of people who frequent the location. There is no limitation, implied or otherwise, on the amount and type of attributes that may be included in the metadata for each location. For example, the attributes may also identify the physical size of the location, other types of products that are sold or displayed, rate of inventory turnover, sales volume, break-down of sales by products, and any other attributes that further characterizes individual locations.

The rules for selecting the products to be sold at the location may be fixture-specific, meaning that they pertain to a particular fixture or type of fixture, or they may be generic and simply applied to a particular fixture, type of fixture, or the location in general. For example, rules may state that a particular product is to be placed on a fixture at a particular location, that there must be no more than a particular number of products on a fixture, and that the fixture may not contain more than one of the same product. The rules may also specify, e.g., that a particular product is to be given priority over other products, that particular types or colors of the product are to be grouped for display, and that sub-groups of the product within a product group are to have specific display characteristics. There is no limitation, implied or otherwise, on the amount and type of rules that may be included. Rules filters, metadata, etc., may be added, deleted or modified by one or more of a campaign manager, a curator, and an operator of a location in a manner similar to that described with reference to system 10.

In some embodiments, the system also includes templates of fixtures within the location. Examples of fixtures include, but are not limited to, dispensers for soda pop, shelving units or gondolas, and deli cases. Basically, any fixture capable of holding, displaying, dispensing, etc., one or more products qualifies as a fixture. The templates contain placeholders, which specify where, on the fixture, the signages for the products may be placed. In some embodiments, the templates are, essentially, digital representations of the fixtures, with placeholders substituted for actual products. In a non-limiting exemplary embodiment, the system includes metadata for every type of fixture available at the location. Each template may contain data that associates it with one or more of locations. Templates may also be provided for portions of fixtures, thereby allowing the system to dictate display on only that portion of a fixture, leaving the remainder of the fixture's display to the operator's discretion.

In some embodiments, the system also includes filters that may place further restrictions on signage distribution and placement. For example, the filters may take into account the location's metadata and determine which products can be sold at that location. For example, the system may include a filter that limits the products that may or may not be sold or displayed in certain locations.

In some embodiments, a campaign manager at a corporate entity may access the system, dictate the amount and types of signages to be supplied to the locations, and generate layout(s) for displaying the signages on the fixtures in the locations. To this end, the system identifies a location, e.g., based on user input. The system uses that identity to query for the profile of that location. The system accesses the profile, the rules and the filters, and uses them to generate signages of products that are available at a particular location. The signages may be allocated to specified templates of fixtures at the location either automatically or in conjunction with user input.

In a non-limiting exemplary embodiment, the system obtains the attributes of a location, e.g., from the location's profile. The system correlates the attributes of the location to information relating to products in order to determine which products are appropriate for each location. For example, the system may use a location's profile to determine its demographics and then determine if a particular product is appropriate for the location. In some embodiments, the system may allow manual selections to override its determination as to which products are appropriate for a particular location. For example, a user (e.g., a campaign manager) may designate a product to be appropriate for a location even though the system may have determined that the product was not appropriate based on, e.g., the demographics.

In some embodiments, the system may group products and then use those groups to assign signages for a location, produce the signages (physical and/or digital), and dictate the placement of those signages on the fixtures within the location. The groups may be organized based on the system's determination of which products are appropriate for a location. The groups may be customized based on a user's input. In addition, a user of the system may group products and then use those groups to assign signages to the location, and to dictate placement of those signages. The groups may be modified through additional, more specific, group settings.

In some embodiments, the signages for the products in a group may be listed according to priority. The listings may be used when determining how the signages are to be displayed within a location. For example, signages for higher priority products in a list may be granted higher priority positions within a fixture. Other rules may govern product and signage placement. For example, a rule may state that the signage for a highest priority product must be placed on the far left of a fixture, signages for the lowest priority product may be placed on the far right of the fixture, and so on. A user may view these groups and edit them, as desired. For example, a user (e.g., a campaign manager) may decide that the signage for a particular product or group should be given a lower priority than that which was allocated. The user may then reassign the priority manually, and the system takes this user assignment into account.

In certain embodiments, the system obtains (e.g., requests and receives) template(s) of fixture(s) in the location from the metadata for that location. If there is more than one fixture, the fixtures themselves may, or may not, be prioritized relative to one another. For example, higher priority fixtures may be for signages for higher priority products, with the highest priority positions within such fixtures being for the signage for the highest priority products within a group destined for a fixture. As noted above, templates may be for only parts of a fixture. Parts of a fixture may be designated as higher priority than other parts. These partial fixture templates may be prioritized and processed as described herein.

In some embodiments, the system applies the rules, such as those described above, for determining how products from the groups are to be arranged on the templates. For example, a rule may state that signage for a particular type of product is to be located at a particular location on a fixture. The rules may take into account priorities of the products in the list when determining the final layout. Once the layout is determined, the system generates a visual layout of the signages on the fixtures.

In generating the layout for a fixture, the system may generate an actual image of how the fixture will look when all signages are displayed. This image may be sent electronically to the location at which the fixture is located. employee staff member at the location may use the image to create the appropriate display. Once the display is created, the staff member may send an electronic image of the layout back to a central authority. The central authority may receive that electronic image. A person or application (e.g., software) at the central authority may compare the electronic image to the generated layout to confirm that the actual display is in compliance with the layout. If it is not, the location may be notified as such, and requested to correct the display. This type of processing may be performed on any type of computing device.

In a non-limiting exemplary embodiment, the system includes a number of Web pages that form a graphical user interface (GUI) for setting parameters which drive the placement of signages. A GUI allows a user to associate a piece of content, e.g., a signage, with a fixture. A placeholder is positioned in all or some of the places where the signages for the products that are part of a particular merchandising category should be placed on a fixture. The same GUI may allow the signages for the products to be placed in a priority-ordered list for the group. Signages for the same product may appear multiple times in the list, and may be selected for fixture placement more than once.

When determining signage and product placement on a fixture (using its template), the system may select all placeholder content for a campaign or merchandising category. The system may then select the signages for those placements using a product list associated with the campaign. In this case, the product list may be a prioritized list of products in a campaign group. If the need for products is greater than the length of the list, the list may be re-used from the top. Thus, the system may place the same signages for a product from a group on a fixture more than once.

In a non-limiting exemplary embodiment, the system may allow signages (and products) to be excluded using one or more filters, such as those described above. A filter may be applied to a product group to eliminate products which may not be appropriate for a location, e.g., based on attributes of the location and information about the product. Resulting filtered product groups may be set as children of a product group and thereby inherit the settings of the parent product group. The product list of the parent group may be used as the initial product list for the child, but products may be removed from the list, preventing them from being placed in the location under consideration. Lists corresponding to product groups may also be reordered to give them different priorities within the set of locations. For each location, the system may decide whether to use the parent group or one of its child groups based on whether or not the filter allows or precludes the location. The first filter match may select that filtered product group. If there is no filter match, the parent group may be used. Filters associated with product groups may allow locations and provide signage orderings for those locations. When none of the filters allow a location, the unfiltered (parent) group's signage orderings are used. In some embodiments, it may be an error if no filter is set. Some embodiments, however, may not require filters.

Displaying relevant signages near to products may support marketing objective(s). Marketing goals for product sales can require a complex balance between availability of a wide variety of products given a limited space, and preference and prominence for high-margin or high-sales items.

After specific products have been assigned to the fixtures at the locations, a list of signages is created.

The embodiments of the systems disclosed herein have applicability in any field. For example, the system may be applied to ensure that products for a particular promotion are given prominent display on a fixture in the location.

In this example, a display layout is to be generated for one of the promotional campaigns. To select a promotion for which signages are to be generated, a user can point and click on the promotion as is done in conventional Web browsing. In response, the system may provide a listing of products and signages that are valid for the campaign. The listings may be according to priority. In addition, the system may determine which products and signages are appropriate for which location, and rules may govern display of those products and signages on fixtures in such locations. In some embodiments, the products and signages may be associated with each other. In some embodiments, the user is provided access to all the products that are part of the campaign. The user can drag and drop signages from the list of available signages to associate signages to be displayed with the subject product. The available signages may include only those signages that are appropriate for use with the subject product.

In some embodiments, the system defines a product group, which is a group that enables users to drive signage placement within a location, e.g., on a fixture in that location. Each such group may be associated with a different merchandising category. A GUI allows users to associate a piece of content, e.g., a signage, with a product group.

In a non-limiting exemplary embodiment of the system, all or part of the processes described herein and their various modifications (hereinafter referred to as "the processes") can be implemented, at least in part, via a computer program product, i.e., a computer program tangibly embodied in one or more information carriers, e.g., in one or more tangible machine-readable storage media, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as special purpose logic circuitry, e.g., an FPGA (Field Programmable Gate Array) and/or an ASIC (Application Specific Integrated Circuit).

Exemplary processors suitable for the execution of a computer program may include, but are not limited to, both general and special purpose microprocessors and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Exemplary machine-readable storage media suitable for embodying computer program instructions and storage include, but are not limited to, all forms of non-volatile devices, including semiconductor devices, EPROM, EEPROM, flash storage, magnetic media, magneto-optical disks, CDs, DVDs, optical disks, among others that are well known in the art or will become available for such purposes.

The term "machine-readable storage media" is not meant to encompass non-statutory subject matter as defined at the time the attached claims are construed. The term "machine-readable storage media", however, is meant to cover any subject matter which is defined as statutory at the times the attached claims are construed.

Elements of different embodiments described herein may be combined to form other embodiments not specifically set forth herein. Elements may be left out of the processes, computer programs, Web pages, etc., described herein without affecting their operation. Furthermore, various separate elements may be combined into one or more individual elements to perform the functions described herein.

The foregoing embodiments describe use of the system in the production (physically and/or digitally) and placement of signages for products associated with a campaign. However, the system may be used to produce physical and/or digital signages for placement anywhere, and is therefore not limited to providing signages for fixtures only.

Elements of the different embodiments described herein may be combined to form other embodiments not specifically set forth herein. Other embodiments not specifically described herein are also within the metes and bounds of the claims.

In view thereof, modified and/or alternate configurations of the embodiments described herein may become apparent or obvious to one of ordinary skill. All such variations are considered as being within the metes and bounds of the instant disclosure. For instance, while reference may have been made to particular structural and/or operational feature(s) and/or function(s), the disclosure is considered to also include embodiments configured for functioning and/or providing functionalities similar to those disclosed herein with reference to the accompanying drawings. Accordingly, the spirit, scope, and intent of the instant disclosure is to embrace all such variations. Consequently, the metes and bounds of the disclosure is solely defined by the appended claims and any and all equivalents thereof.

What is claimed is:

1. A system, comprising:
   metadata for a plurality of locations, wherein the metadata for each location comprises:
      number of fixtures in the location; and
      type of each fixture in the location;
   metadata for a plurality of fixtures, wherein the metadata for each fixture comprises:
      number of signage holders; and
      dimensions of a signage for each signage holder;
   metadata for a plurality of campaigns, wherein the metadata for each campaign comprises:
      a plurality of products associated with the campaign; and
      graphics for each of the plurality of products;
   rules for each location, the rules defining:
      assignment of one or more products selected from the plurality of products associated with a campaign selected from the plurality of campaigns;
      number of signages;
      dimensions of each signage;
      graphics for each signage corresponding to one of the one or more assigned products;
   an apparatus for producing signages for the plurality of locations as defined by the rules for each location; and
   filters for segregating the signages produced into a plurality of kits, wherein each kit comprises signages for one of the plurality of locations as defined by the rules for that location.

2. The system of claim 1, wherein the metadata for each location comprises:
   geographic location;
   information pertaining to one or more competitors within a pre-defined distance;
   demographics within a pre-defined area; and
   sales data from a previous campaign substantially similar to the selected campaign.

3. The system of claim 2, wherein for each location the rules defining the assignment of the one or more products is based on at least one of:
   the geographic location;
   similar products sold by the one or more competitors;

the demographics and the sales data from the previous campaign.

4. The system of claim 3, wherein the rules for each location define the pricing for each of the one or more assignment products.

5. The system of claim 4, wherein the pricing is based on at least one of:
the geographic location;
the one or more competitors' pricing;
the demographics; and
the sales data from the previous campaign.

6. The system of claim 1, wherein a campaign manager is authorized to change the metadata for each campaign and to change the rules for each location.

7. The system of claim 6, wherein changing the rules for each location comprises changing the graphics for one or more signages for that location.

8. The system of claim 1, wherein a curator is authorized to change the metadata for one or more of the plurality of locations.

9. The system of claim 1, wherein an operator of each of the plurality of locations is authorized to change the number of fixtures in that location and to change the type of each fixture in that location.

10. The system of claim 1, comprising distributing the plurality of kits, wherein each kit is delivered to the location for which it was packaged.

11. The system of claim 1, wherein for each location, the number of signages is an arithmetic total of the number of signage holders associated with each fixture.

12. The system of claim 11, wherein the number of signages produced is an arithmetic total of the number of signages for each location.

13. The system of claim 1, wherein for each location the metadata comprises number, type, and dimensions of additional signages; and
the rules define the graphics for each additional signage.

14. The system of claim 1, configured for creating a manifest for each location, the manifest comprising a listing and quantity of each of the produced signages.

15. A system, comprising:
metadata for a plurality of locations, wherein the metadata for each location comprises:
number of fixtures in the location; and
type of each fixture in the location;
metadata for a plurality of fixtures, wherein the metadata for each fixture comprises the number of signage displays;
metadata for a plurality of campaigns, wherein the metadata for each campaign comprises:
a plurality of products associated with the campaign; and
graphics for each of the plurality of products;
rules for each location, the rules defining:
assignment of one or more products selected from the plurality of products associated with a campaign selected from the plurality of campaigns; and
graphics for each signage display corresponding to one of the one or more assigned products;
filters for segregating the display graphics into a plurality of data packets, wherein each data packet comprises the display graphics for one of the plurality of locations as defined by the rules for that location;
transmitting the data packet to the location for which it was prepared; and
displaying the graphics contained in the data packet in the location to which it was transmitted.

16. The system of claim 15, wherein the metadata for each location comprises:
geographic location;
information pertaining to one or more competitors within a pre-defined distance;
demographics within a pre-defined area;
customer preferences for each of the one or more assigned products; and
sales data from a previous campaign substantially similar to the selected campaign.

17. The system of claim 16, wherein for each location the rules defining the assignment of the one or more products is based on at least one of:
the geographic location;
similar products sold by the one or more competitors;
the demographics;
customer preferences; and
the sales data from the previous campaign.

18. The system of claim 17, wherein the rules for each location define the pricing for each of the one or more assignment products.

19. The system of claim 18, wherein the pricing is based on at least one of:
the geographic location;
the one or more competitors' pricing;
the demographics;
customer preferences; and
the sales data from the previous campaign.

20. The system of claim 15, wherein a campaign manager is authorized to change the metadata for each campaign and to change the rules for each location.

21. The system of claim 15, wherein a curator is authorized to change the metadata for one or more of the plurality of locations.

22. The system of claim 15, wherein an operator of each of the plurality of locations is authorized to change the number of fixtures in that location and to change the type of each fixture in that location.

23. The system of claim 15, wherein for each location the metadata comprises number of additional displays; and
the rules define the graphics for each additional signage.

* * * * *